US011576343B2

(12) United States Patent
Horanoff

(10) Patent No.: US 11,576,343 B2
(45) Date of Patent: Feb. 14, 2023

(54) MOTION AND OBSTRUCTION SENSING SYSTEM

(71) Applicant: Jerry Horanoff, Downingtown, PA (US)

(72) Inventor: Jerry Horanoff, Downingtown, PA (US)

(*) Notice: Subject to any disclaimer, the term of this patent is extended or adjusted under 35 U.S.C. 154(b) by 305 days.

(21) Appl. No.: 16/949,195

(22) Filed: Oct. 19, 2020

(65) Prior Publication Data

US 2021/0112770 A1     Apr. 22, 2021

Related U.S. Application Data

(60) Provisional application No. 62/916,411, filed on Oct. 17, 2019.

(51) Int. Cl.
*A01K 1/01* (2006.01)
*A01K 29/00* (2006.01)
*G06V 40/10* (2022.01)

(52) U.S. Cl.
CPC ............ *A01K 1/011* (2013.01); *A01K 29/005* (2013.01); *G06V 40/103* (2022.01)

(58) Field of Classification Search
CPC ..... A01K 1/011; A01K 29/005; G06V 40/103
USPC .................................................. 119/165, 166
See application file for complete search history.

(56) References Cited

U.S. PATENT DOCUMENTS

| | | | | | |
|---|---|---|---|---|---|
| 5,931,119 | A | * | 8/1999 | Nissim | A01K 1/0114 119/166 |
| 6,126,015 | A | * | 10/2000 | Haymaker | B07B 1/28 209/362 |
| 6,205,954 | B1 | * | 3/2001 | Bogaerts | A01K 1/0114 119/166 |
| 2002/0139312 | A1 | * | 10/2002 | Reitz | A01K 1/0114 119/165 |
| 2021/0251182 | A1 | * | 8/2021 | Anderson | A01K 1/011 |
| 2022/0142114 | A1 | * | 5/2022 | Baxter | A01K 1/0114 |

* cited by examiner

*Primary Examiner* — Yvonne R Abbott-Lewis
(74) *Attorney, Agent, or Firm* — John P Donohue, Jr.

(57) ABSTRACT

Apparatus and methods are disclosed for detecting motion between two subassemblies, for example in or near a litter box. A first subassembly includes a first frame adapted for supporting a receptacle. A second subassembly includes a second frame adapted for resting on a steady surface. Connecting members connect the subassemblies such that relative movement between them can occur. At least a first position indicating member is attached to one the subassemblies and at least a first detector is attached to the other of the subassemblies. The detector is positioned proximate the first position indicating member so that changes in relative position are detected. Preferably, the device includes a second position indicating member and a second detector for detecting more precise changes in relative position. It is also preferred for each position indicating member to include a patterned marker.

29 Claims, 15 Drawing Sheets

MOTION AND OBSTRUCTION SENSING SYSTEM

CROSS-REFERENCE TO RELATED APPLICATIONS

This application claims priority to U.S. Provisional Patent Application No. 62/916,411 filed Oct. 17, 2019, entitled MOTION AND OBSTRUCTION SENSING SYSTEM, the entire disclosure of which is incorporated herein by reference.

BACKGROUND

The invention is an apparatus used for detecting the presence, direction, and/or intensity of a force being applied to an object. This invention could be applied to a variety of fields. In one application described hereinafter, the invention is incorporated in an automatic litter box such as that disclosed in U.S. Pat. No. 7,647,889, the contents of which is incorporated herein by reference. Although the description of the invention is made in the context of an automatic litter box, the scope and applicability of the invention is broader.

With regard to the application of the invention to an automatic litter box, the present invention has at least two purposes. The first purpose is to detect the presence of an animal within and its ingress/egress to/from an unenclosed litter compartment. The second purpose is to detect obstructions during the cycling phases of an automatic litter box, determine the direction of force, and, if appropriate, momentarily reverse the direction of the cycle to release pressure potentially caused by the cycling phase, and ultimately stop the cycle. Neither of these purposes are addressed in U.S. Pat. No. 7,647,889.

Some automatic litter boxes use various forms of weight sensors to detect the presence of an animal. Weight sensors have various issues making them difficult for use in detecting the presence of an animal within a litter compartment. Some weight sensors are not sensitive enough for smaller animals, and weight sensors that are sensitive enough tend to be relatively expensive. Weight sensors also must compensate for when litter is slowly but ultimately discarded by the cleaning cycle as well as compensate when new litter is added. The application of this invention solves these problems and permits the use of inexpensive components to detect small vibrations caused by an animal's ingress/egress to/from the litter compartment.

Due to the open nature of the litter box described in U.S. Pat. No. 7,647,889, there are edges and corners that will be moving during the cleaning cycle of the litter box. Although the movement of such edges and corners are not dangerous when viewed in isolation, one must consider the safety concerns that may exist should a customer ignore the instruction manual and place the litter box too close to other objects. Collision with other objects, such as electrical plugs or table legs, contacted by such moving edges and corners could have a damaging result. The present invention takes some precautions as a safeguard to customers that do not follow directions.

Accordingly, a need exists to adapt devices exhibiting automated movement, such as the litter box described in U.S. Pat. No. 7,647,889, to detect motion in or near the litter box and/or obstructions in or near the litter box.

SUMMARY

The need to adapt devices exhibiting automated movement, such as a litter box, to detect motion in or near the litter box and/or obstructions in or near the litter box is satisfied and other advantages are achieved in an apparatus which includes a first subassembly having a first frame adapted for supporting a receptacle and a second subassembly having a second frame adapted for resting on a steady surface. Connecting members connect the first and second subassemblies such that relative movement between the first and second subassemblies can occur. At least a first position member is attached to one the subassemblies and at least a first detector is attached to the other of the subassemblies and positioned proximate the first position member so that changes in the relative position of the first position member are detected.

Preferably, the device includes a second position member and a second detector positioned proximate the second position member so that changes in the relative position of the second position member are detected. In such an embodiment, the first and second position members are connected to one subassembly and the first and second detectors are connected to the other subassembly. It is especially preferred for the first and second detectors to be pivotally connected to the subassembly.

It is also preferred for the connecting members to include flexible support rods defining first and second flexible arms. The first and second arms may be oriented generally perpendicular to one another when attached. The first and second arms are each attached at one end to the subassembly.

It is also preferred for the first and second arms to include markers attached proximate the respective free ends of the arms. It is especially preferred for the markers to include a pattern formed on the surface thereof. Alternatively, the markers can include a predetermined shape. The markers could alternatively be positioned on the distal ends of the arms in which case the detectors are positioned so that the distal ends move towards and away from the detectors.

It is preferred for the detectors to be photodetectors, respectively, wherein the photodetectors are positioned to detect light reflected from the arms. It is especially preferred for the photodetectors to be a reflective optical sensor for transmitting light and receiving reflected light. In such an embodiment, it is preferred for the detectors to include shrouds positioned to shield the photodetectors from ambient light. It is also preferred for the shrouds to be positioned and dimensioned to permit the movement of the arms therein. It is especially preferred for the arms and the interior chape of the shrouds to be complementary. In such a case, as the arm moves within a shroud the shaped surface of the arm moves along the shaped portion of the shroud thereby resisting axial rotation.

A more complete understanding of illustrative embodiments will become apparent and appreciated by reference to the following Detailed Description and claims in view of the accompanying figures of the drawing.

BRIEF DESCRIPTION OF THE DRAWINGS

Exemplary embodiments will be further described with reference to the figures of the drawing, wherein.

DETAILED DESCRIPTION

The methods and mechanical structure used to detect animal presence and/or obstructions are the same. Each purpose is achieved using at least one sensor but preferably two separate sensors. By using the same sensor type for each sensor instance, economy of scale can be achieved requiring less tooling and less expensive cost of goods along with highly accurate results.

In relation to a litter box such as that disclosed in U.S. Pat. No. 7,647,889, the present invention can stop a cycle should an animal ingress/egress to/from the open litter compartment during a cycle. It is not strictly necessary to stop the litter box mid-cycle because the litter box is preferably designed to have break-away panels to prevent injury to an animal or human. However, as an extra safety feature, mid-cycle stopping is considered desirable. If not for this feature, one would only need one instance of sensor hardware. One could use the same sensor to detect an obstruction to also detect the presence of an animal when not cycling. In other words, when not cycling one could use the obstruction sensor to detect the presence of an animal, and when cycling we can use the sensor for detecting an obstruction.

The invention consists of structure and methods used to detect the presence of a delta offset and/or intensity of an offset between two subassemblies over time for various purposes. One such purpose is to detect movement/vibration indicating the presence of an entity causing the movement/vibration. Another purpose, in the case where the device itself is moving, is to detect contact with another entity physically present in the device. A third purpose, in the case where the device is not moving itself, but the device is attached to and/or in communication with another device that is moving, is to detect when the other device contacts another entity, or another entity contacts it.

Figure 1:
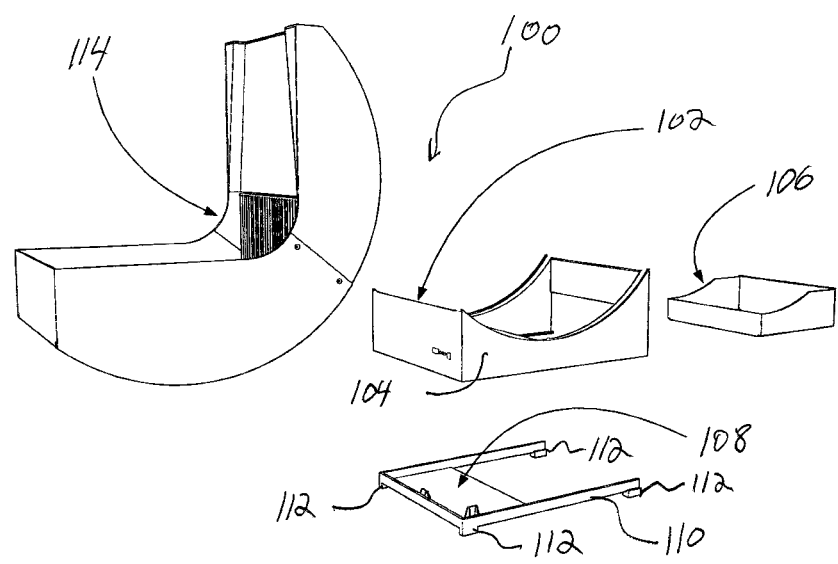
FIG. 1 is an exploded view of the major subassemblies in an automated litter box.
Figure 2:
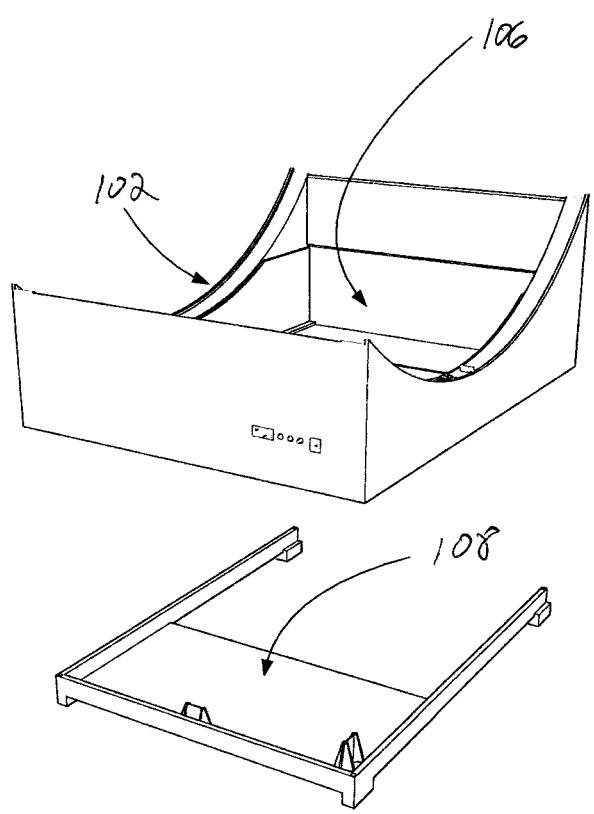
FIG. 2 is an exploded view of two subassemblies depicted in FIG. 1.
Figure 3:
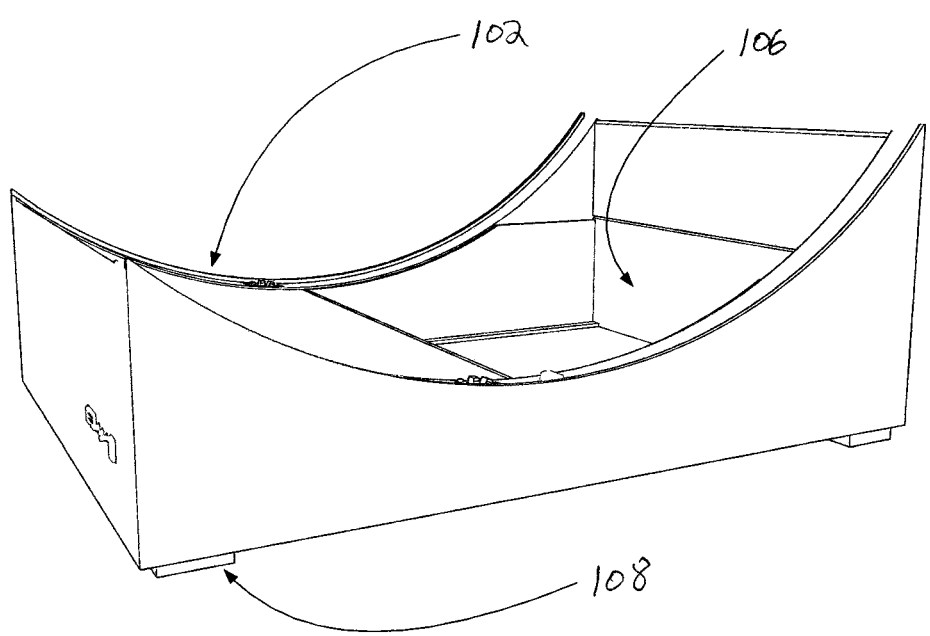
FIG. 3 is a perspective view of the two subassemblies depicted in FIG. 2, connected to one another.

Referring to FIG. 1, larger structural components are depicted of an automated litter box for incorporating the invention, generally designated 100. Litter box 100 includes a first subassembly 102 and includes a first frame 104 for supporting a receptacle 106 for receiving animal waste. A second subassembly 108 includes a frame 110. Frame 110 rests on a steady surface, such as a floor, counter, table, shelf, or other flat surface by means of feet 112. An upper unit assembly 114 is also depicted. As more fully described in U.S. Pat. No. 7,647,889, assembly 114 is rotatably mounted to subassembly 102 and designed to remove animal waste when rotated. As shown in FIG. 2, waste receptacle 106 may be inserted into subassembly 102 such that waste receptacle 106 is directly under the upper unit assembly 114. As shown in FIG. 3, subassembly 102 is sized so that it at least partially overlays subassembly 108. In this way, components mounted to subassembly 108, described below, will be preferably hidden from view.

Figure 4:
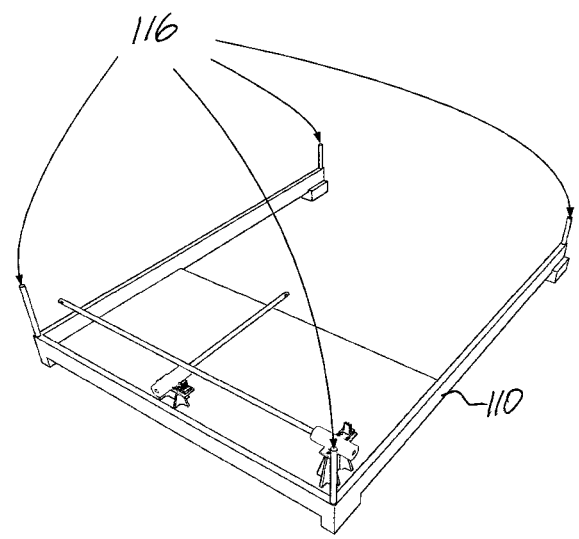
FIG. 4, is a partial perspective view of one of the subassemblies depicted in FIG. 2 including connecting rods and portions of the motion/obstruction sensor assemblies.
Figure 5:
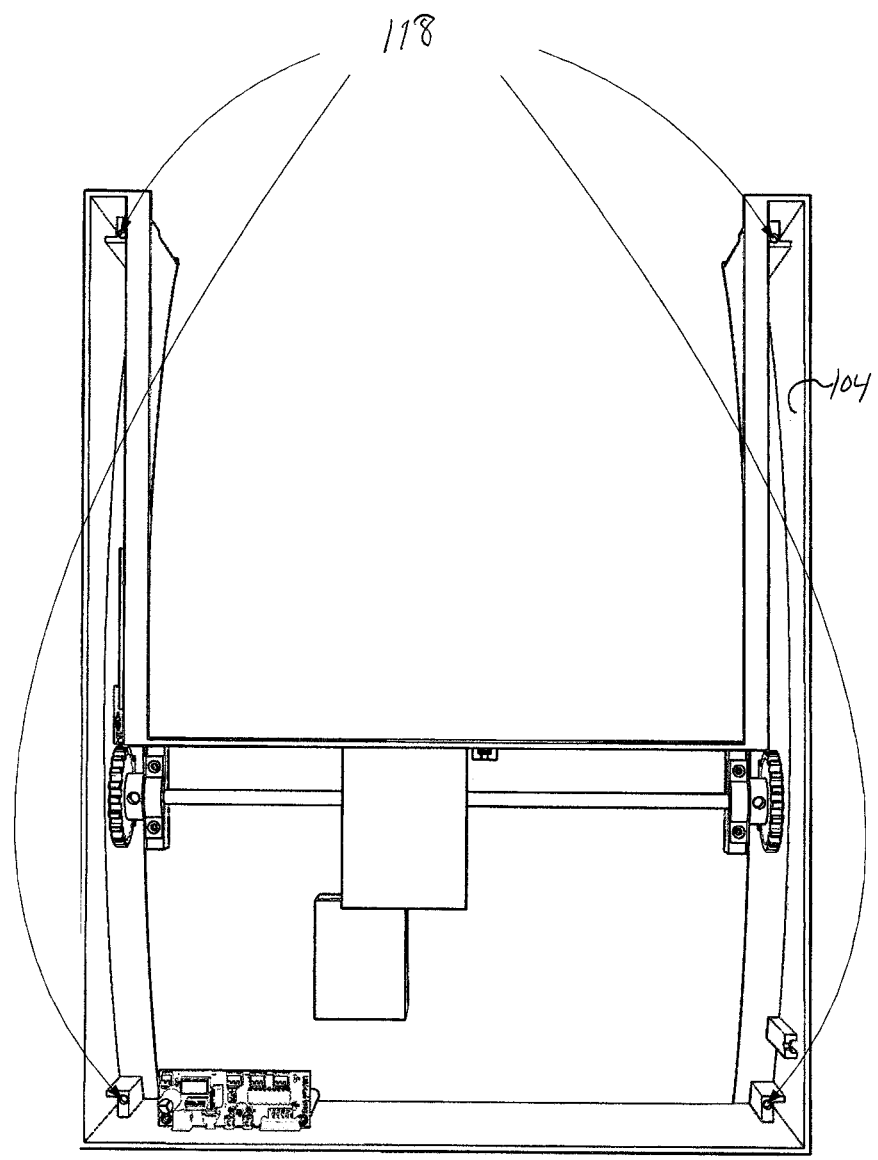
FIG. 5, is a bottom perspective view of another of the subassemblies depicted in FIG. 2.

Referring to FIG. 4, connecting members 116 are shown to be connected at one end to frame 110. Preferably, members 116 are connected to the outer corners of frame 110. As shown in FIG. 5, the other ends of connecting members 116 are to be connected to brackets 118 attached to frame 104. In the preferred embodiment, members 116 are rods formed from a plastic material which exhibit some flexibility. Again, rods 116 are attached at one end to frame 110 and at the other end to frame 102. Due to the flexible nature of members 116, relative movement between subassembly 102 and subassembly 108 can occur. As shown in FIG. 5, brackets 118 each include a recess for receiving an end of the rods depicted in FIG. 4. Preferably rods 116 are held within the recesses via a friction fit.

The invention achieves the purposes described above by detecting a delta offset between subassemblies 102 and 108. Flexible support rods 116 are stiff but flexible for the purpose of allowing subassembly 102 to move relative to subassembly 108 in such a way as to cause a measurable delta deflection without compromising the required support necessary to support subassembly 102 above subassembly 108. Flexible support rods formed from DuPont Nylon® are preferred because they are very hard to break, hold their shape well, and exhibit a material memory that tends to return the subassemblies to their original relative positions. However, rods formed from other plastic materials and rods made of other materials, such as wood, rubber, springs, and elastomeric materials can also be used provided they are stiff but flexible for the purpose of allowing subassembly 102 to move relative to subassembly 108.

The amount of deflection required is dependent on the characteristics of the components selected to detect the deflection, but typically an acceptable deflection would be any deflection within a ⅛" radius relative to the where rods 116 mounts to frame 104 when viewing the mounting point from below as viewed in FIG. 5. Frame 110 rests on a resting solid surface due to the force of gravity. The friction force in the contact points between feet 112 and the resting solid surface is preferably great enough to keep frame 110 stationary during operation such that the frictional force of the contact can only be overcome beyond the useful measuring capability of the invention.

Figure 6:
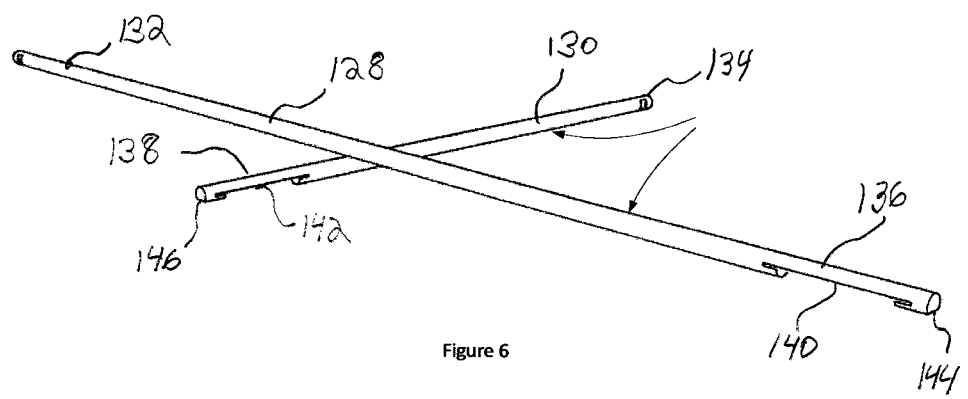
FIG. 6 is an isolated perspective view of the positioning rods of the present invention.

The figures depict two sensing assemblies. Referring first to FIGS. 6-10B, the preferred sensing assembly includes a position member 120 having a marker 122, a shroud 124, and a motion detector 126. Position member includes at least a first position member and preferably two position members 128 and 130. Each of position members 128 and 130 are formed as a rod. As shown in FIG. 6, rods 128 and 130 each include a first end 132, 134 and a second end 136, 138. A flattened section 140 and 142 is formed at one end of each rod 128 and 130. Additionally, the distal ends of rods 128 and 130 include a flat key portion 144 and 146, respectively.

Figures 10A, 10B:
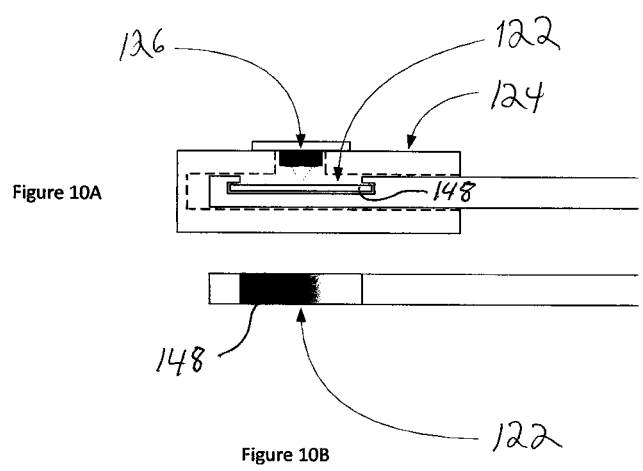
FIG. 10A is an isolated side view of a positioning rod having one end inserted into a shroud mounted onto one of the detectors used in one embodiment of the present invention.
FIG. 10B is an isolated view of the end of the positioning rod depicted in FIG. 10A having a marker mounted thereon in one embodiment of the present invention.

As shown in FIG. 10B, marker 122 preferably includes gray scale paper 148, i.e., paper having a gray scale printed thereon. As depicted the grey scale changes from predominantly white to predominantly black along the length of paper 148. Accordingly, locations along the length of marker paper 148 will reflect more or less light. Although, the depicted pattern includes an analog-like pattern, it is within the scope of the invention to use any pattern susceptible to indicating movement. For example, a digital pattern or a bar code like pattern could be utilized. Any pattern capable of reflecting more or less light along its length is envisioned as acceptable.

Figure 7:
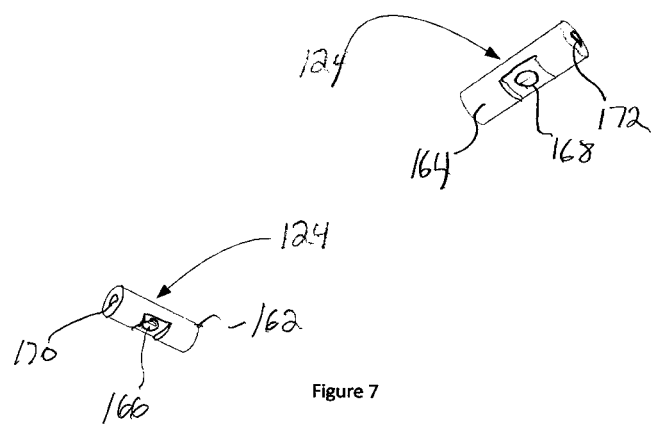
FIG. 7 is an isolated perspective view of the shrouds in one embodiment of the present invention.
Figure 8:
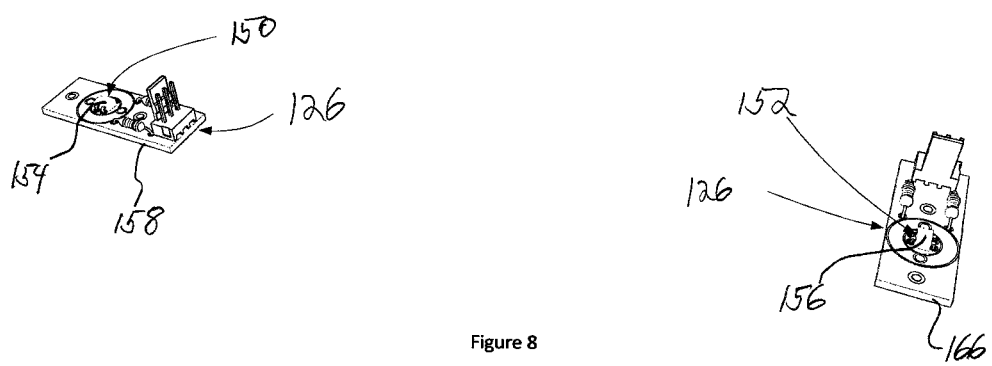
FIG. 8 is an isolated perspective view of detectors used in one embodiment of the present invention.

As shown in FIGS. 7 and 8, motion detector 126 includes at least a first detector 150 and preferably a second detector 152. Each detector preferably includes a reflective photo interrupter 154 and 156, such as a QRE1113GR Miniature Reflective Object Sensor sold by Digi-Key Electronics of Thief River Falls, Minn. Each interrupter 154 and 156 is mounted to associated circuit boards 158 and 160 respectively. Detectors 150 and 152 also each include shrouds 162 and 164. Each shroud defines an inner cavity. As explained below, these cavities receive the free ends of rods 128 and 130. Passages 166 and 168 are formed in shrouds 162 and 164.

Figure 9:
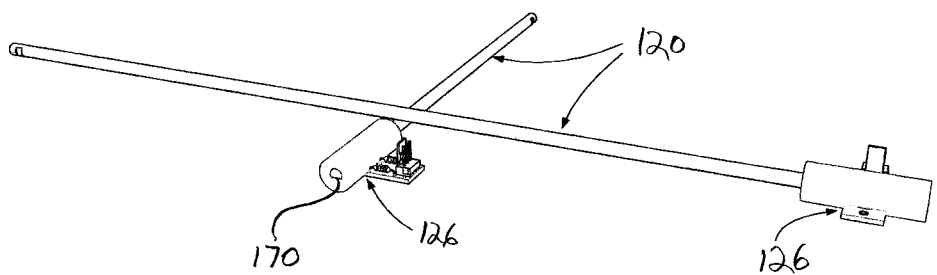
FIG. 9 is an isolated perspective view of positioning rods having one end inserted into the shrouds mounted onto the detectors used in one embodiment of the present invention.

As shown in FIGS. 9 and 10, shrouds 162 and 164 are respectively connected to detectors 150 and 152. Shrouds 162 and 164 are preferable mounted to circuit boards 158 and 160, however they could alternatively be mounted to interrupters 154 and 156. Shrouds 162 and 164 are connected so that light emitted from and reflected to reflective photo interrupters 154 and 156 pass through passages 166 and 168. In this way shrouds 162 and 164 block ambient light from reflective photo interrupters 154 and 156.

Shrouds 162 and 164 are preferably a black-colored part that surrounds the compact reflective photo interrupter for the dual purpose of preventing ambient light from entering the assembly and for simultaneously supporting a position member/rod inserted into the shroud. Specifically, the exterior shape of the arms and the interior shape of the cavities defined by shrouds 162 and 164 are complementary. More particularly, the exterior surface of rods 128 and 130 is a shaped surface proximate at least the free ends of the rods and the cavity defined by the shrouds is formed to include a complimentary shaped surface, so that as the positioning arms/rods move within the shroud the shaped surface of the arms move along the shaped portion of the shroud cavity thereby resisting axial rotation of the arm within the shroud. As depicted, shrouds 162 and 164 are configured to permit axial movement within the shroud of the otherwise unsupported end. Flat portions 170 and 172 formed in the ends of shrouds 162 and 164 help guild the flat rod portions 144 and 146 during ingress/egress of rods 128 and 130 to/from detectors 150 and 152. It will be appreciated from the foregoing that one end of each rod 128 and 130 is contained by and moves axially within a respective shroud 162 and 164. Shrouds 162 and 164 simultaneously guide rods 128 and 130 and resist axial rotation of rods 128 and 130. As described previously, it is preferred for rods 128 and 130 to exhibit some degree of flexibility. If rods 128 and 130 are not sufficiently flexible, it may be necessary to mount shrouds 162 and 164 to circuit boards 158 and 160 and, in turn, to mount boards 158 and 160 pivotally to subassembly 108.

Figure 11:
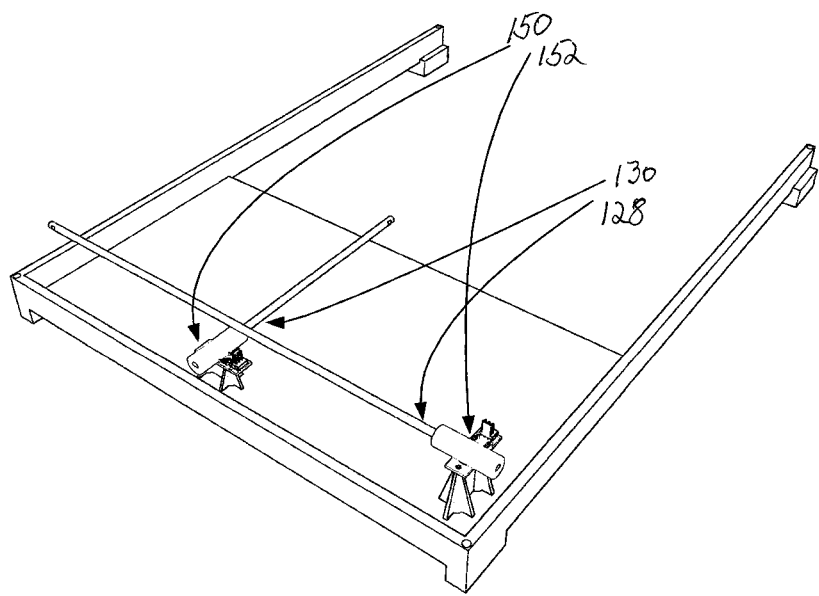
FIG. 11 is an isolated view of one subassembly frame onto which the detectors have been mounted in one embodiment of the present invention.
Figure 12:
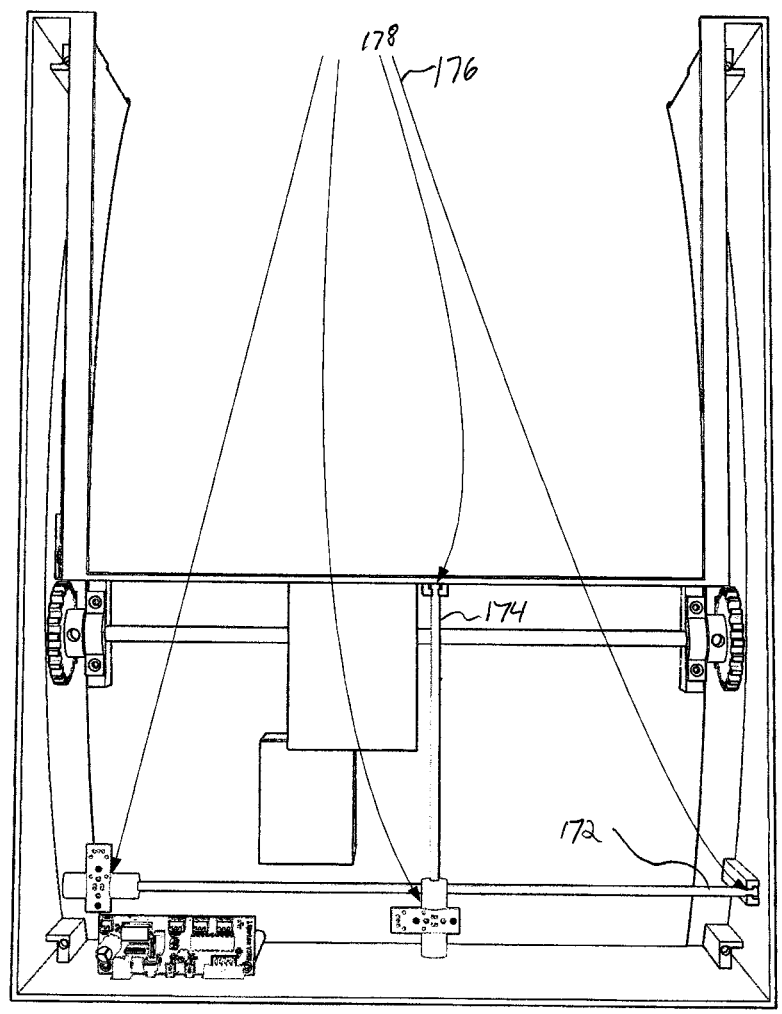
FIG. 12 is a bottom perspective view of another subassembly onto which the positioning rods have been attached in one embodiment of the present invention.

Referring now to FIGS. 11 and 12, one end 172 and 174 of each rod 128 and 130 is attached to frame 104 of subassembly 102 at attachment points 176 and 178. The other rod ends 136 and 138 are positioned within shrouds 162 and 164. Detectors 150 and 152 are mounted to frame 110, preferably pivotally, by attaching circuit boards 158 and 160 to frame 110. It should be appreciated that although rods 128 and 130 are shown attached to frame 104 and detectors 150 and 152 are shown as attached to frame 110, the opposite attachments are envisioned. In such an embodiment, rods 128 and 130 would be attached to frame 110 and detectors 150 and 152 would be attached to frame 104.

Figure 13:
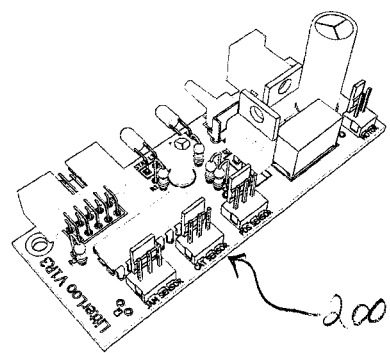
FIG. 13 is a perspective view of the electronic controller utilized in one embodiment of the present invention.
Figure 13:
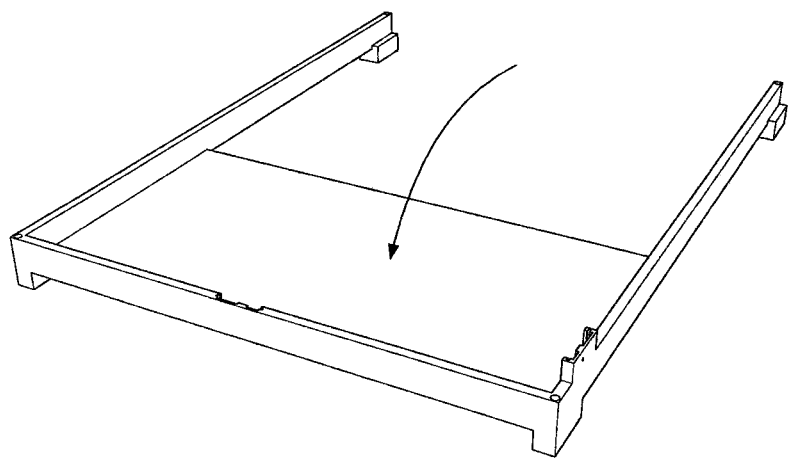
Figure 14:
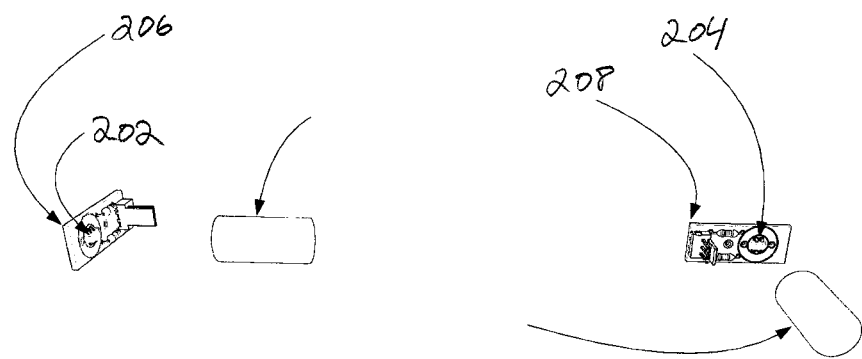
FIG. 14 is an isolated exploded view of the shrouds and detectors used one embodiment of the present invention.
Figure 15:
FIG. 15 is a perspective view of the shrouds and detectors used another embodiment of the present invention.
Figure 16:
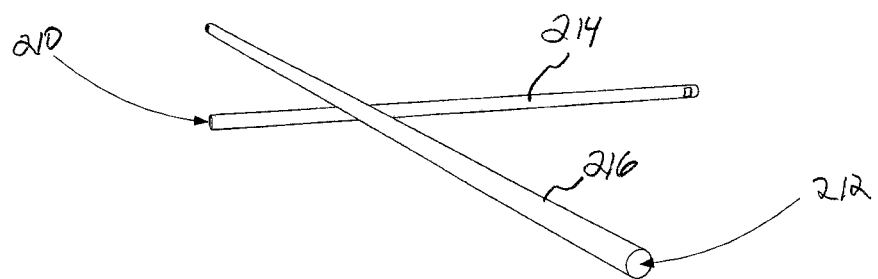
FIG. 16 is a perspective view of the positioning rods use in the embodiment of the invention depicted in FIG. 15.

In operation, the compact reflective photo interrupters 154 and 156 via circuit boards 158 and 160 send a signal to the controller which controls the automated litter box communicating a measurement of the amount of light reflected back off markers 148 attached to each end 136 and 138 of rods 128 and 130 based on the insertion/extraction distance of the rods from detectors 126 generated due to the offset of subassembly 102 relative to subassembly 108. Preferably, the circuit board sends a signal (typically an analog signal) to the controller shown in FIG. 13. The Controller incorporates an Analog-to-Digital converter for each circuit board 158 and 160. This Analog-to-Digital converter converts the analog signal into a digital signal that the controller's software can use to make decisions. To detect an ingress/egress of an animal, the controller simply monitors for any change in signal beyond a configurable threshold. The right sensor 152 shown in FIG. 11 is used to detect vibrations while the unit is stationary, and also while the unit is in motion because rod 128 is inserted/extracted in a perpendicular direction to the direction of rotation of the upper unit assembly 114, and therefore will receive less vibration due to rotation than left sensor 150. As a result, sensor 152 is called the motion sensor because of its ability to resist detection of longitudinal forces caused by rotation of the upper unit assembly 114. The threshold for sensor 152 to detect the presence of an animal is significantly increased to not mistakenly interpret the rotational vibration as a vibration caused by the presence of an animal.

To detect an obstruction, controller 200, preferably a PIC16F1786 manufactured by Microchip Technologies of Chandler Ariz., monitors for an increasing or decreasing signal over time. The obstruction sensor 150 shown on FIG. 11 is oriented such that the insertion/extraction direction of the rod 130 is parallel to the direction of travel of the upper unit assembly 114. The controller's software is architected such that it ignores vibrations in the Obstruction Sensor 150. A vibration is characterized by a signal that is repetitively increasing and decreasing over time such that it can be represented in cycles per second, or Hertz (i.e. Hz). A vibration will have a Hz value of a designated frequency or higher. A typical Hz threshold value might be 3 Hz—meaning that the software considers any cycle>=3 Hz as a vibration and is therefore ignored by the Obstruction Sensor 150. The Controller's software is also architected to adjust for drift in the Obstruction Sensor due to the shifting weight of litter/waste that has shifted more toward the front or more toward the back due to changes in rotational direction of the upper unit assembly 114. Drift can be accounted for by re-centering the sensor's calculated resting position over time. Drift will have a Hz value of a designated frequency or lower. A typical Hz threshold value might be 0.01 Hz; however, software-wise it's easier to adjust for drift by simply allowing the center to shift in the higher or lower direction by analyzing a recent average of values, determining if the vector from center is pointing higher or lower, and increasing/decreasing the center value by 1 unit once per N units of time. An example value for N might be 2 seconds. Detecting which direction an obstruction is detected is trivial in that, if an obstruction is detected at all, it will be obvious based on the values returned by the circuit boards 158 and 160 whether the obstruction caused an insertion of the sensor rod, or an extraction of the sensor rod since the signal will be increasing over time or decreasing over time. To detect an obstruction the software on the controller 200 monitors for an average increase and an average decrease (detecting one or the other) in signal reported by boards 158 and 160. It does this by averaging readings at a high frequency of >10 readings per second and typically 100 readings per second or more. The software then calculates a moving average. If this moving average is clearly moving generally away from the resting position in a clear single direction, then an obstruction has been detected by the controller 200, the direction of rotation of the upper unit assembly is optionally reversed momentarily to relieve any pressure caused by the obstruction, and stop the upper unit assembly from rotating. The software in controller 200 can then optionally retry to complete its cycle at a later time, and ultimately optionally stop trying to complete its cycle and optionally report an error code to the user.

Figure 17:
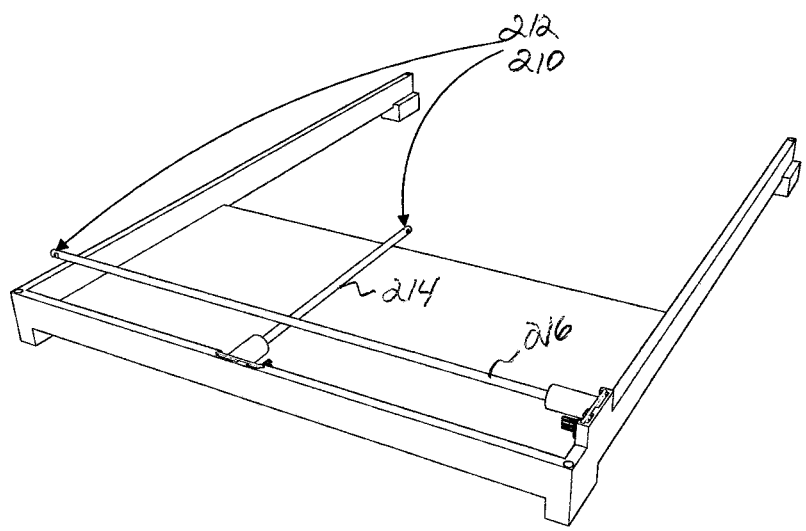
FIG. 17 is a perspective view the shrouds, detectors, and positioning rods used in the embodiment of the invention depicted in FIG. 15.

In an alternate embodiment, the compact reflective photo interrupters 202 and 204 and circuit boards 206 and 208 are oriented such that each compact reflective photo interrupter is sensing a reflective material 210 and 212 positioned on the end of motion sensor rods 214 and 216. As the distance of the end of the motion sensor rod changes due to the insertion/extraction of the motion sensor rod, the signal generated by the compact reflective photo interrupter becomes stronger on insertion, and weaker on extraction in a non-linear way. If linear results are desired, such results can be generated through software via mathematical translation by controller 200. These results can also be achieved via electronics in known ways. FIG. 17 shows how the motion sensor detector assembly attaches to frame 108 in this alternate embodiment and shows how rods 214 and 215 are inserted into the detectors.

There are various locations and orientations for the positioning of the Compact Reflective Photo Interrupter relative to the position member/rod, and various shapes, colors, perforations, transparencies, etc. . . . that could be used in place of the Grey Scale Paper that the Compact Reflective Photo Interrupter could be measuring at the end of the rods 128 and 130 or to a component attached to the rods. There are also various alternatives to a Compact Reflective Photo Interrupter capable of measuring movement to an effective accuracy that could be employed.

In yet another embodiment, the end of the position member/rod could be shaped or have an attached shaped member that would vary the reading of a Compact Reflective Photo Interrupter. In yet another embodiment, varying transparency could be used to detect varying translucency by positioning an emitter opposite the detector. For example, placing a device that emits light towards one end of a positioning member and then using a passive light detector where the output of the detector will vary based upon the position of the emitter in relation to the detector. In yet another embodiment, the Flexible Support Rods or connecting members 116 are not attached to a frame included with the device, but rather the Resting Solid Surface on which the Flexible Support Rods rest acts as the frame. In this sense, the Flexible support Rods act like Feet such that the bottom of the Feet rest on the Resting Solid Surface and support frame 104. These Flexible Support Rods therefore still allow for a delta deflection to occur between frame 104 and the Resting Solid Surface. In this embodiment, the deflection can be measure via alternate means. In one such embodiment, a mechanism much like those used for a mouse attached to a computer can be used such that tframe 104 and Flexible Support Rods 116 act like a computer mouse, and the resting solid surface acts like the surface on which a computer mouse measures movement. Various types of input devices have been developed to measure motion to a high degree of accuracy. Such input devices have historically used a roller ball. In other implementations of a mouse, optical devices have also been developed (Optical Mouse). There are numerous other ways to sense movement to reasonably high degrees of accuracy. Some further examples of sensors are Hall effect sensors and magnets (for example, proximity of a magnet to a Hall effect sensor can be measured to determine the closeness of the magnetic field). In another embodiment, a strain gauge can be used to measure lateral pressure, a weight sensor is effectively a strain gauge, but instead of measuring weight it can be used to measure pressure in a lateral direction. In yet another embodiment, the floating end of the flexible support rod could be attached to a pivot point of a rotating component (much like a piston rod is attached to a crank shaft) such that different measuring devices could be attached to measure rotational movement. One such device could be something similar to a crank angle sensor. Alternatively, a circuit board with a gravity directional sensor could be used.

It should be appreciated that the illustrations and discussions of the embodiments shown in the figures are for exemplary purposes only and should not be construed as limiting the disclosure. As noted previously, the present disclosure contemplates various embodiments. Additionally, the concepts described above may be employed alone or in combination. It should be further appreciated that the various alternative embodiments described above with respect to one illustrated embodiment can apply to all embodiments as described herein, unless otherwise indicated.

What is claimed is:

1. An apparatus, for use with an automated device for receiving animal waste, for detecting the presence of a potential obstruction in or near said device, said apparatus comprising:
    a first subassembly comprising a first frame adapted for supporting a receptacle for receiving animal waste;
    a second subassembly comprising a second frame adapted for resting on a steady surface;
    connecting members for connecting said first and second subassemblies such that relative movement between said first and second subassemblies can occur;
    at least a first position member attached to one of said first and second subassemblies; and
    at least a first detector attached to the other of said first and second subassemblies and positioned proximate said first position member so that changes in the relative position of said first position member is detected.

2. The apparatus of claim 1, further comprising a second position member attached to one of said first and second subassemblies and a second detector attached to the other of said first and second subassemblies and positioned proximate said second position member so that changes in the relative position of said second position member is detected.

3. The apparatus of claim 1, wherein said connecting members comprise flexible support rods.

4. The apparatus of claim 1, wherein said first detector is pivotally connected.

5. The apparatus of claim 1, wherein said first position member comprises a first flexible arm.

6. The apparatus of claim 5, wherein said first arm is pivotally attached at one end to one of said subassemblies.

7. The apparatus of claim 1, wherein said first position member further comprises a first marker attached proximate the free end of said position member.

8. The apparatus of claim 7, wherein said first marker comprises a pattern formed on the surface thereof.

9. The apparatus of claim 7, wherein said first marker further comprises an emitter attached toward one end a position member and wherein changes in translucency are indicative of relative movement between said emitter and said detector.

10. The apparatus of claim 1, wherein said first detector comprises a first photodetector wherein said photodetector is positioned to detect light reflected from said first arm.

11. The apparatus of claim 10, wherein said photodetector comprises a reflective optical sensor for transmitting light and receiving reflected light.

12. The apparatus of claim 10, wherein said first detector further comprises a first shroud defining a central cavity wherein said shroud is positioned to shield said first photodetector from ambient light and is positioned and dimensioned to permit the movement of said first position member in said cavity.

13. The apparatus of claim 12, wherein the exterior shape of said position member and the interior shape of said cavity are complementary.

14. The apparatus of claim 13, wherein said exterior shape comprises a shaped surface proximate said free end and said cavity in said shroud comprises a complimentary shaped surface, so that as said positioning member moves within said shroud the shaped surface of said member moves along the shaped portion of said shroud thereby resisting axial rotation of said member within said shroud.

15. An apparatus for use with an automated device for receiving animal waste, for detecting motion in said device, said apparatus comprising:
   a first subassembly comprising a first frame adapted for supporting a receptacle for receiving animal waste;
   a second subassembly comprising a second frame adapted for resting on a steady surface;
   connecting members for connecting said first and second subassemblies such that relative movement between said first and second subassemblies can occur;
   at least a first position member attached to one of said first and second subassemblies; and
   at least a first detector attached to the other of said first and second subassemblies and positioned proximate said first position member so that changes in the relative position of said first position member is detected.

16. The apparatus of claim 15, further comprising a second position member attached to one of said first and second subassemblies and a second detector attached to the other of said first and second subassemblies and positioned proximate said second position member so that changes in the relative position of said second position member is detected.

17. The apparatus of claim 15, wherein said connecting members comprise flexible support rods.

18. The apparatus of claim 15, wherein said first detector is pivotally connected.

19. The apparatus of claim 15, wherein said first position member comprises a first flexible arm.

20. The apparatus of claim 19, wherein said first arm is pivotally attached at one end to one of said subassemblies.

21. The apparatus of claim 15, wherein said first position member further comprises a first marker attached proximate the free end of said position member.

22. The apparatus of claim 21, wherein said first marker comprises a pattern formed on the surface thereof.

23. The apparatus of claim 21, wherein said first marker comprises an emitter attached toward one end a position member and wherein changes in translucency are indicative of relative movement between said emitter and said detector.

24. The apparatus of claim 15, wherein said first detector comprises a first photodetector wherein said photodetector is positioned to detect light reflected from said first arm.

25. The apparatus of claim 24, wherein said photodetector comprises a reflective optical sensor for transmitting light and receiving reflected light.

26. The apparatus of claim 24, wherein said first detector further comprises a first shroud defining a central cavity wherein said shroud is positioned to shield said first photodetector from ambient light and is positioned and dimensioned to permit the movement of said first position member in said cavity.

27. The apparatus of claim 26, wherein the exterior shape of said position member and the interior shape of said cavity are complementary.

28. The apparatus of claim 27, wherein said exterior shape comprises a shaped surface proximate said free end and said cavity in said shroud comprises a complimentary shaped surface, so that as said positioning member moves within said shroud the shaped surface of said member moves along the shaped portion of said shroud thereby resisting axial rotation of said member within said shroud.

29. An apparatus for detecting relative motion between first and second frames, said apparatus comprising:
   a first subassembly comprising said first frame;
   a second subassembly comprising a second frame adapted for resting on a steady surface;
   connecting members for connecting said first and second subassemblies such that relative movement between said first and second subassemblies can occur;
   at least one first position member attached to one of said first and second subassemblies; and
   at least one first detector attached to the other of said second subassembly and positioned proximate said first position members so that changes in the relative position of said position member is detected.

* * * * *

UNITED STATES PATENT AND TRADEMARK OFFICE
CERTIFICATE OF CORRECTION

| | | |
|---|---|---|
| PATENT NO. | : 11,576,343 B2 | Page 1 of 1 |
| APPLICATION NO. | : 16/949195 | |
| DATED | : February 14, 2023 | |
| INVENTOR(S) | : Jerry Horanoff | |

It is certified that error appears in the above-identified patent and that said Letters Patent is hereby corrected as shown below:

In the Claims

Claim 9, Column 9, Line 17, after "one end" insert -- of --.

Claim 23, Column 10, Line 20, after "one end" insert -- of --.

Claim 29, Column 10, Line 58, delete "second subassembly" and insert -- subassemblies --.

Signed and Sealed this
Tenth Day of February, 2026

John A. Squires
*Director of the United States Patent and Trademark Office*